UNITED STATES PATENT OFFICE.

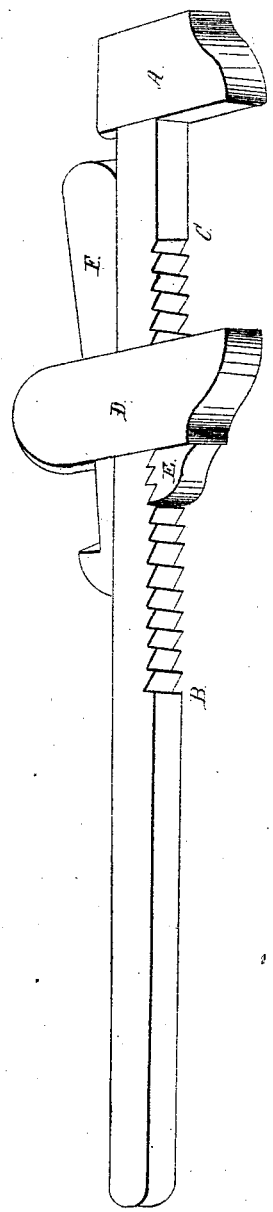

JAMES BRETT, OF NEWBURGH, NEW YORK.

SCREW-WRENCH.

Specification of Letters Patent No. 2,165, dated July 10, 1841.

*To all whom it may concern:*

Be it known that I, JAMES BRETT, of Newburgh, in the county of Orange and State of New York, have invented a new and useful Improvement on Key-Wrenches; and I do hereby declare that the following is a full, clear, and exact description of the construction and operation of the same, reference being had to the annexed drawing, making a part of this specification.

The wrench is of iron or steel with a jaw (marked on the said drawing A) in the usual form. On the edge of the bar of the wrench are cut a number of teeth, similar to the teeth of a saw, sufficient in number and of such size as may be most convenient for the purpose for which the wrench is to be used, as is represented on the drawing from B to C. On the bar is a movable slide (marked D on the drawing) with which is united a part on which is cut three or four teeth made to fit the teeth on the bar and sufficient in number to retain the slide steadily in its place as is represented on the drawing and marked E. The slide is made to fit loosely on the bar so that the teeth on the bar and slide can be entirely disengaged, and the slide moved either way to its desired place and is then tightened and fixed by an iron key or wedge as is represented in the drawing and marked F.

What I claim as my invention is—

The teeth on the slide and their combination and connection with the teeth on the bar.

I make no claim whatever as the inventor of any other parts of the wrench.

Dated Newburgh June 14, 1841.

JAMES BRETT.

Witnesses:
   GEO. LOMAS,
   P. F. HUM.